United States Patent
Ichikawa et al.

(10) Patent No.: US 10,057,756 B2
(45) Date of Patent: Aug. 21, 2018

(54) TERMINAL DETECTION METHOD AND COMMUNICATION DEVICE

(71) Applicants: FUJITSU TEN LIMITED, Kobe-shi, Hyogo (JP); HONDA MOTOR CO., LTD., Tokyo (JP); TOSHIBA INFORMATION SYSTEMS (JAPAN) CORPORATION, Kawasaki-shi, Kanagawa (JP)

(72) Inventors: Masaki Ichikawa, Kobe (JP); Koichi Nagata, Kobe (JP); Shigeaki Esaka, Wako (JP); Motoi Nagata, Wako (JP); Hirotoshi Takahashi, Kawasaki (JP)

(73) Assignees: FUJITSU TEN LIMITED, Kobe-shi (JP); HONDA MOTOR CO., LTD., Tokyo (JP); TOSHIBA INFORMATION SYSTEMS (JAPAN) CORPORATION, Kawasaki-shi (JP)

(*) Notice: Subject to any disclaimer, the term of this patent is extended or adjusted under 35 U.S.C. 154(b) by 0 days.

(21) Appl. No.: 15/675,897

(22) Filed: Aug. 14, 2017

(65) Prior Publication Data
US 2018/0077558 A1   Mar. 15, 2018

(30) Foreign Application Priority Data
Sep. 13, 2016 (JP) .................. 2016-178728

(51) Int. Cl.
*H04B 7/00* (2006.01)
*H04W 8/00* (2009.01)
(Continued)

(52) U.S. Cl.
CPC .......... *H04W 8/005* (2013.01); *H04W 4/008* (2013.01); *H04W 4/80* (2018.02); *H04W 68/005* (2013.01); *H04W 88/02* (2013.01)

(58) Field of Classification Search
CPC ....... H04W 4/08; H04W 8/005; H04W 48/10; H04W 48/16; H04W 72/121;
(Continued)

(56) References Cited

U.S. PATENT DOCUMENTS 7,631,054 B2 * 12/2009 French .................. G06F 9/4416
                                                          709/220
9,125,178 B2 * 9/2015 Taniguchi ............ G08B 25/016
(Continued)

FOREIGN PATENT DOCUMENTS

| JP | 2009-141436 A | 6/2009 |
| JP | 2010-063053 A | 3/2010 |
| JP | 2015-100069 A | 5/2015 |

*Primary Examiner* — Quochien B Vuong
(74) *Attorney, Agent, or Firm* — Oliff PLC (57) ABSTRACT

A terminal detection method that includes a search step, a first acquisition step, a second acquisition step, and a detection step. The search step transmits a response request through broadcast communication and searches a terminal device that exists within a predetermined range. The first acquisition step acquires, from the terminal device, at least specific information of the terminal device. The second acquisition step executes communication with the terminal device based on the specific information acquired in the first acquisition step and acquires second information that indicates a function possessed by the terminal device. The detection step detects that the terminal device has a desired function based on the first information acquired in the first acquisition step and the second information acquired in the second acquisition step.

8 Claims, 6 Drawing Sheets

(51) Int. Cl.
*H04W 68/00* (2009.01)
*H04W 4/00* (2018.01)
*H04W 4/80* (2018.01)
*H04W 88/02* (2009.01)

(58) Field of Classification Search
CPC ...... H04W 84/12; H04W 88/08; H04B 7/024; H04B 7/0413; H04M 1/7253; H04M 2250/02; H04M 2250/06
USPC .................. 455/41.2, 51.3, 507; 370/328.338
See application file for complete search history.

(56) References Cited

U.S. PATENT DOCUMENTS

| | | | |
|---|---|---|---|
| 9,807,197 B2 * | 10/2017 | Adisesha | ................ H04L 67/32 |
| 2009/0143014 A1 | 6/2009 | Honda et al. | |
| 2016/0301755 A1 * | 10/2016 | Lee | ....................... H04L 67/125 |

* cited by examiner

| | TERMINAL INFORMATION | | | |
|---|---|---|---|---|
| | PRESENCE OR ABSENCE OF HFP COMPATIBILITY | PRESENCE OR ABSENCE OF AVP COMPATIBILITY | NAME | BT ADDRESS |
| TERMINAL DEVICE A | PRESENCE | PRESENCE | AAAA | 11:11:11:11:11:11 |
| TERMINAL DEVICE B | ABSENCE | ABSENCE | BBBB | 22:22:22:22:22:22 |
| TERMINAL DEVICE C | PRESENCE | ABSENCE | CCCC | 33:33:33:33:33:33 |
| TERMINAL DEVICE D | PRESENCE | PRESENCE | UNKNOWN | 44:44:44:44:44:44 |
| TERMINAL DEVICE E | UNKNOWN | UNKNOWN | UNKNOWN | 55:55:55:55:55:55 |
| TERMINAL DEVICE F | UNKNOWN | UNKNOWN | UNKNOWN | 66:66:66:66:66:66 |

FIG.3B

| | TERMINAL INFORMATION | | | |
|---|---|---|---|---|
| | PRESENCE OR ABSENCE OF HFP COMPATIBILITY | PRESENCE OR ABSENCE OF AVP COMPATIBILITY | NAME | BT ADDRESS |
| TERMINAL DEVICE A | PRESENCE | PRESENCE | AAAA | 11:11:11:11:11:11 |
| TERMINAL DEVICE B | ABSENCE | ABSENCE | BBBB | 22:22:22:22:22:22 |
| TERMINAL DEVICE C | PRESENCE | ABSENCE | CCCC | 33:33:33:33:33:33 |
| TERMINAL DEVICE D | PRESENCE | PRESENCE | UNKNOWN | 44:44:44:44:44:44 |
| TERMINAL DEVICE E | PRESENCE | PRESENCE | UNKNOWN | 55:55:55:55:55:55 |
| TERMINAL DEVICE F | PRESENCE | PRESENCE | FFFF | 66:66:66:66:66:66 |

FIG.3C

| | TERMINAL INFORMATION | | | |
|---|---|---|---|---|
| | PRESENCE OR ABSENCE OF HFP COMPATIBILITY | PRESENCE OR ABSENCE OF AVP COMPATIBILITY | NAME | BT ADDRESS |
| TERMINAL DEVICE A | PRESENCE | PRESENCE | AAAA | 11:11:11:11:11:11 |
| TERMINAL DEVICE B | ABSENCE | ABSENCE | BBBB | 22:22:22:22:22:22 |
| TERMINAL DEVICE C | PRESENCE | ABSENCE | CCCC | 33:33:33:33:33:33 |
| TERMINAL DEVICE D | PRESENCE | PRESENCE | DDDD | 44:44:44:44:44:44 |
| TERMINAL DEVICE E | PRESENCE | PRESENCE | UNKNOWN | 55:55:55:55:55:55 |
| TERMINAL DEVICE F | PRESENCE | PRESENCE | FFFF | 66:66:66:66:66:66 |

TERMINAL DETECTION METHOD AND COMMUNICATION DEVICE

CROSS-REFERENCE TO RELATED APPLICATION

This application is based upon and claims the benefit of priority of the prior Japanese Patent Application No. 2016-178728, filed on Sep. 13, 2016, the entire contents of which are incorporated herein by reference.

FIELD

An embodiment of the disclosure relate to a terminal detection method and a communication device.

BACKGROUND

A terminal detection method has conventionally been provided in such a manner that a response request is transmitted from a communication device to search a terminal device that exists within a predetermined range from the communication device and a terminal device that has a desired function is detected based on response information that is transmitted from the terminal device in response to the response request (see, for example, Japanese Laid-open Patent Publication No. 2010-063053).

However, it may be impossible for such a conventional terminal detection method to detect a terminal device has a desired function, depending on a model of such a terminal device.

SUMMARY

A terminal detection method according to the present invention includes a search step, a first acquisition step, a second acquisition step, and a detection step. The search step transmits a response request through broadcast communication and searches a terminal device that exists within a predetermined range. The first acquisition step acquires, from the terminal device, at least specific information of the terminal device in response information that includes the specific information and first information that indicates a function that is possessed by the terminal device, as a response to the response request. The second acquisition step separately executes communication with the terminal device based on the specific information acquired in the first acquisition step, and acquires second information that indicates a function that is possessed by the terminal device, in a case where the first information is not included in the response information acquired in the first acquisition step. The detection step detects the terminal device that has a desired function based on the first information acquired in the first acquisition step and the second information acquired in the second acquisition step.

BRIEF DESCRIPTION OF DRAWING(S)

More complete recognition of the present invention and advantage involved therewith could readily be understood by reading the following detailed description of the invention in light of the accompanying drawing(s).

DESCRIPTION OF EMBODIMENT(S)

Hereinafter, a terminal detection method and a communication device as disclosed in the present application will be described in detail with reference to the accompanying drawing(s). This invention is not limited by an embodiment(s) as illustrated below.

Figure 1:
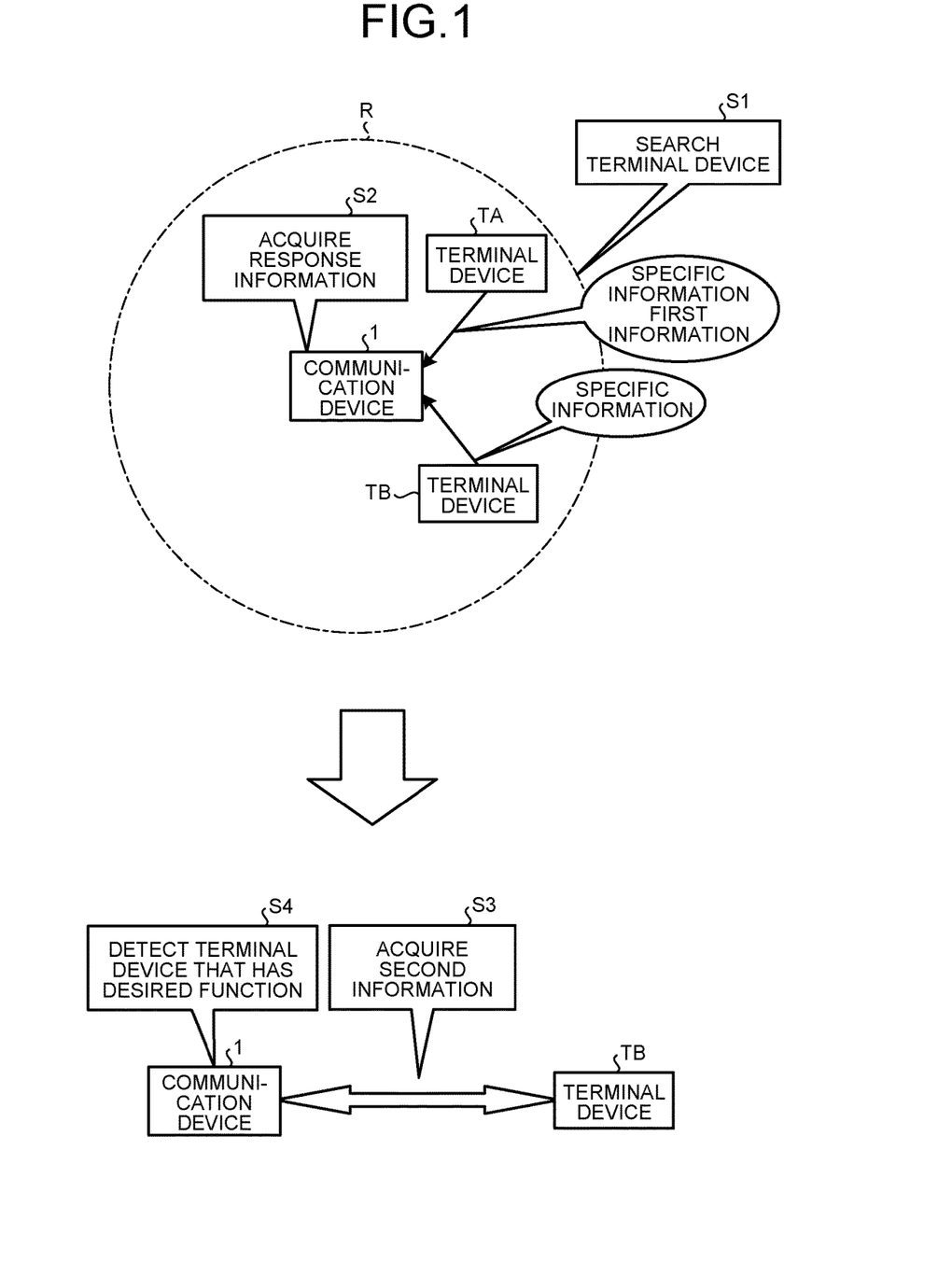
FIG. 1 is a diagram illustrating an outline of a terminal detection method.

First, an outline of a terminal detection method according to an embodiment will be described by using FIG. 1. FIG. 1 is a diagram illustrating an outline of a terminal detection method. Such a terminal detection method is executed by a communication device 1 as illustrated in FIG. 1.

FIG. 1 illustrates a case where the communication device 1 detects a terminal device that has a desired function at a time of initial connection (so-called time of pairing) of near field communication by using a terminal detection method according to an embodiment. A case where Bluetooth (registered trademark) is used as near field communication will be described below. However, this is not limiting, and it is possible to apply a terminal detection method according to an embodiment even in a case where the communication device 1 detects a terminal device that has a desired function by using another type of near field communication.

A terminal device includes, for example, a mobile phone, a smartphone, a tablet terminal, a personal computer, or another communication device that is compatible with Bluetooth.

For example, as illustrated in FIG. 1 the communication device 1, first, receives a search instruction operation of a user to transmit a response request through broadcast communication and search a terminal device that exits within a predetermined range R (step S1). In other words, the communication device 1 transmits a response request to an arbitrary terminal device that exists within a predetermined range R. In FIG. 1, a predetermined range R is an inside of a circle that is indicated by a dashed-dotted line.

In FIG. 1, two terminal devices that are a terminal device TA and a terminal device TB exist within a predetermined range R, and hence, both the terminal device TA and the terminal device TB receive a response request.

Then, the communication device 1 acquires response information from each of the terminal device TA and the terminal device TB that have received a response request (step S2). Herein, response information includes specific information of each terminal device or first information that indicates a function that is possessed by each terminal device.

The communication device 1 acquires at least specific information as response information. This is because such a terminal device may notify the communication device 1 of none of first information as response information for a response request, depending on a kind of the terminal device.

FIG. 1 illustrates a case where the communication device 1 receives specific information and first information as a response signal from the terminal device TA and receive specific information from the terminal device TB.

Specific information includes information such as a name (so-called friendly name) of a terminal device or a Bluetooth address (that will be referred to as a BT address, below).

A function indicates an application cooperative with the communication device 1 after connection of near field communication between a terminal device and the communication device 1. For such a function, for example, a hands-free call function, an audio reproduction function, or the like is provided. A "function" that is possessed by a terminal device may be described as a "terminal function" below, in order to avoid linguistic confusion with a generally used function.

Herein, unless a terminal function that is possessed by a terminal device is cooperative with the communication device 1, it is impossible to cooperate with such a terminal function even in a case where a terminal device is connected to the communication device 1.

That is, for example, in a case where a terminal device is compatible with a hands-free call function, it is impossible to cooperate a hands-free call function of a terminal device with the communication device 1 unless the communication device 1 is not compatible with the hands-free call function.

Accordingly, in a conventional terminal detection method, a terminal device that has a terminal function cooperative with the communication device 1 is detected as a terminal device connectable to the communication device 1.

However, notification of first information as response information from a side of a terminal device to the communication device 1 is arbitrary. Accordingly, specific information may be transmitted to a side of the communication device 1 without including first information in response information, depending on a model of a terminal device or setting of a side of a terminal device, like the terminal device TB as illustrated in FIG. 1.

In such a case, in a conventional terminal detection method, for a terminal device that does not notify the communication device 1 of first information as response information, it is impossible to know a terminal function that is possessed by such a terminal device.

Accordingly, in the present embodiment, in such a case, the communication device 1 separately executes communication with a terminal device, and acquires information that indicates a terminal function that is possessed by such a terminal device.

Specifically, the communication device 1 separately executes communication with the terminal device TB based on specific information acquired at step S2 and acquires, from the terminal device TB, second information that indicates a terminal function that is possessed by the terminal device TB (step S3).

Then, the communication device 1 detects a terminal device that has a desired function based on first information acquired at step S2 and second information acquired at step S3 (step S4). A desired function refers to a terminal function cooperative with the communication device 1 as described above.

Thus, in the present embodiment, in a case where first information is not included in response information, the communication device 1 separately executes communication with the terminal device TB and acquires, from the terminal device TB, second information that indicates a terminal function that is possessed by the terminal device TB.

Thereby, it is possible for the communication device 1 to reliably acquire information that indicates a terminal function from a terminal device that has received a response request. That is, in the present embodiment, it is possible for the communication device 1 to acquire information that indicates a terminal function that is possessed by such a terminal device from all terminal devices that have received a response request, independently of setting of a side of a terminal device or a model thereof.

In the present embodiment, a terminal device that has a desired function is detected based on such information, and hence, it is possible to detect a terminal device that has a desired function and is not conventionally detected. Therefore, according to the present embodiment, it is possible to improve detection accuracy of a terminal device that has a desired function.

Although a case where second information is acquired from the terminal device TB that has not transmitted first information as response information to the communication device 1 has been described in an example as described above, the second information may be acquired from all of terminal devices (that include, for example, the terminal device TA as illustrated in the same figure).

Although a case where the communication device 1 detects a terminal device that has a desired terminal function after first information and second information are acquired has been described in an example as described above (step S4 as illustrated in FIG. 1), this is not limiting. That is, it is also possible for the communication device 1 to execute a process of detecting a terminal device communicable with the communication device 1 for each acquisition of first information or second information.

In the present embodiment, in a case where name information that indicates a name of a terminal device is not included in specific information acquired from a terminal device that has a desired terminal function, the communication device 1 executes a process of reacquiring such name information. A detail of such a matter will be described later by using FIG. 3A to FIG. 3C.

In the present embodiment, in a case where a terminal device that has a desired terminal function is detected, it is also possible to notify a user of such a terminal device as a terminal connectable to the communication device 1. A detail of such a matter will be described later by using FIG. 4.

Figure 2:
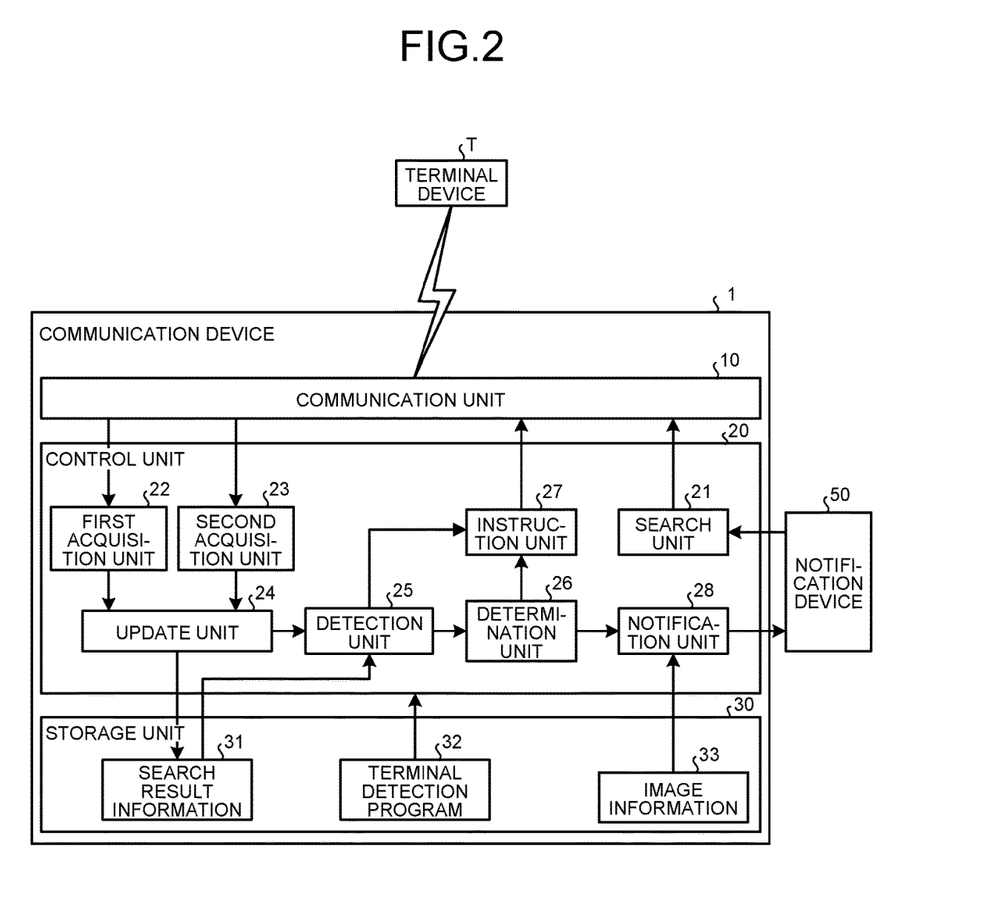
FIG. 2 is a block diagram of a communication device.

Next, a configuration example of the communication device 1 that executes a terminal detection method as described by using FIG. 1 will be described by using FIG. 2. FIG. 2 is a block diagram of the communication device 1. Herein, the same figure illustrates a terminal device T and a notification device 50 in combination. A plurality of terminal devices may collectively be described as a terminal device T below.

Hereinafter, a case where the communication device 1 is an on-vehicle device will be described below, and a case where a terminal function that is possessed by a terminal device T cooperative with the communication device 1 is a hands-free call function and an audio reproduction function will be described. A terminal function cooperative with the communication device 1 is not limited thereto.

As illustrated in FIG. 2, the communication device 1 includes a communication unit 10, a control unit 20, and a storage unit 30. The communication unit 10 includes a communication module with a predetermined communication standard (for example, Bluetooth) and executes communication with a terminal device T according to control of the control unit 20.

The control unit 20 includes a search unit 21, a first acquisition unit 22, a second acquisition unit 23, an update unit 24, a detection unit 25, a determination unit 26, an instruction unit 27, and a notification unit 28. The storage unit 30 stores search result information 31, a terminal detection program 32, and image information 33.

The control unit 20 includes, for example, a computer or a variety of circuits that has/have a Central Processing Unit (CPU), a Read Only Memory (ROM), a Random Access Memory (RAM), a Hard Disk Driver (HDD), an input/output port, and the like.

A CPU of a computer reads and executes, for example, the terminal detection program 32 stored in a ROM, and thereby, functions as the search unit 21, the first acquisition unit 22, the second acquisition unit 23, the update unit 24, the detection unit 25, the determination unit 26, the instruction unit 27, and the notification unit 28 of the control unit 20.

It is also possible for hardware such as an Application Specific Integrated Circuit (ASIC) or a Field Programmable Gate Array (FPGA) to compose at least one or all of the search unit 21, the first acquisition unit 22, the second acquisition unit 23, the update unit 24, the detection unit 25, the determination unit 26, the instruction unit 27, and the notification unit 28 of the control unit 20.

The storage unit 30 corresponds to, for example, a ROM, a RAM, and a HDD. It is possible for a ROM, a RAM, and a HDD to store the search result information 31, the terminal detection program 32, and the image information 33. The control unit 20 may acquire the terminal detection program 32 as described above or a variety of information through another computer connected through a wired or wireless network or a portable recording medium.

The search result information 31, the terminal detection program 32, and the image information 33 may be stored in mutually different recording media.

For example, as a terminal search request is acquired from a notification device 50 as described later, the search unit 21 of the control unit 20 transmits a response request and searches a terminal device T that exists in a predetermined range R (see FIG. 1). Specifically, as a terminal search request is input, the search unit 21 instructs the communication unit 10 to execute transmission of a response request.

As the communication unit 10 is instructed to execute transmission of a response request, the search unit 21 starts a timer. As such a timer reaches a first period of time, the search unit 21 causes the communication unit 10 to stop transmission of a response request.

Such a first period of time is, for example, 15 seconds. This is because, in a case where the communication device 1 is used as an on-vehicle device, a period of time enough to search all of terminal devices T provided in a vehicle is secured. A first period of time is not limited thereto, and it is possible to execute changing to an arbitrary value depending on a place or situation where the communication device 1 is set. In a case where response information is acquired from a preset number of (for example, five) terminal devices T, the search unit 21 may stop transmission of a response request.

Timing when a terminal search request is input from the notification device 50 to the search unit 21 is timing when the notification device 50 accepts a predetermined operation of a user (for example, pushing of a search start button or the like). However, this is not limiting, and for example, it is possible to arbitrarily change timing when an electrical power source of the notification device 50 is powered on, or the like.

The first acquisition unit 22 acquires, through the communication unit 10, response information that is transmitted from a terminal device T that has received a response request through broadcast communication. As described above, response information includes specific information or first information.

Specifically, the first acquisition unit 22 acquires response information as a beacon signal from each terminal device T. Then, the first acquisition unit 22 scans an acquired beacon signal and acquires specific information or first information that is included in such a beacon signal.

The first acquisition unit 22 acquires first information as a Universally Unique Identifier (UUID). Scanning of a beacon signal that is transmitted from a terminal device T may be executed by the communication unit 10 instead of the first acquisition unit 22.

In a case where first information is not included in response information, the second acquisition unit 23 executes separate communication between the communication device 1 and a terminal device T and acquires second information that indicates a terminal function that is possessed by such a terminal device T.

In such a case, it is possible to apply, for example, Asynchronous Connection Less (ACL) to separate communication between the communication device 1 and a terminal device T. The second acquisition unit 23 acquires second information as a Service Discovery Protocol (SDP) from a terminal device T through packet communication that uses ACL.

The communication device 1 needs more time for one terminal device T in a case where second information is acquired than a case where response information is acquired. This is because the communication device 1 has to communicate with a terminal device T separately at a time of acquisition of second information, as described above.

Accordingly, in the present embodiment, the communication device 1 causes only a terminal device T that could not have acquired first information as response information to be a target for acquisition of second information. Thereby, it is possible to reduce a period of time for acquiring second information as compared with a case where the communication device 1 acquires second information from all of terminal devices T. In other words, it is possible to reduce a period of time that is needed to detect a connectable terminal.

A period of time that is needed for the first acquisition unit 22 to acquire first information from a terminal device T is approximately 1 second per unit. A period of time that is needed for the second acquisition unit 23 to acquire second information from each terminal device T is approximately 3 second per unit.

For example, the first acquisition unit 22 and the second acquisition unit 23 convert acquired first information and second information into an identical file format and output converted information to the update unit 24.

Hereinafter, such converted information will be described as compatible profile information. For such compatible profile information, for example, a Hands Free Profile (that will be referred to as an HFP below), an Audio Video Profile (that will be referred to as an AVP below), or the like is provided.

The first acquisition unit 22 transmits specific information acquired from a terminal device T to the update unit 24. The first acquisition unit 22 and the second acquisition unit 23 may be configured as one acquisition unit.

The update unit 24 updates the search result information 31 stored in the storage unit 30 based on specific information or compatible profile information that is input from the first acquisition unit 22 and the second acquisition unit 23.

The update unit 24 notifies the detection unit 25 of update notification of the search result information 31 every time the search result information 31 is updated. A detail of the search result information 31 will be described later by using FIG. 3A to FIG. 3C.

The detection unit 25 detects a terminal device T that has a desired terminal function based on first information acquired by the first acquisition unit 22 and second information acquired by the second acquisition unit 23.

Specifically, the detection unit 25 detects a terminal device T that has a desired terminal function cooperative with the communication device 1, as a connectable terminal, based on the search result information 31 every time update notification as described above is input from the update unit 24.

The detection unit 25 extracts from the search result information 31, and outputs to the determination unit 26, information relating to a terminal device T detected as a connectable terminal (that will be referred to as terminal information below). Terminal information includes specific information and compatible profile information.

The detection unit 25 detects a terminal device T with compatible profile information being unknown, based on the search result information 31. In other words, the detection unit 25 detects a terminal device T that has not notified the communication device 1 of first information as response information.

In a case where such a terminal device T is detected, the detection unit 25 transmits a BT address of such a terminal device T to the instruction unit 27 and outputs a request of acquisition of second information. Thereby, the instruction unit 27 as described later instructs such a terminal device T to execute transmission of second information and the second acquisition unit 23 acquires the second information from the terminal device T.

In a case where terminal information is input from the detection unit 25, the determination unit 26 determines whether or not name information of a terminal device T is included in such terminal information. Name information is information that is used in a case where notification information is produced in the notification unit 28 as described later.

In a case where it is determined that name information is included in terminal information, the determination unit 26 outputs such terminal information to the notification unit 28 and instructs to execute production of notification information. On the other hand, in a case where it is determined that name information is not included in terminal information, the determination unit 26 outputs such terminal information to the instruction unit 27 and notifies of a request of reacquisition of the name information.

The instruction unit 27 instructs a terminal device T to execute transmission of information through the communication unit 10, depending on a request that is input from the detection unit 25 and the determination unit 26.

Specifically, in a case where a request of acquisition of second information is input from the detection unit 25, the instruction unit 27 notifies the communication unit 10 of a BT address and instructs to execute establishment of separate communication with a terminal device T with such a BT address. Afterward, the instruction unit 27 instructs a terminal device T that has established communication with a terminal device T to execute transmission of second information.

In a case where a request of reacquisition of name information is input from the determination unit 26, the instruction unit 27 notifies the communication unit 10 of, for example, a BT address, and instructs a terminal device T with such a BT address to execute retransmission of name information.

Thereby, in a case where the first acquisition unit 22 has not acquired name information as response information from a terminal device T, it is possible to acquire name information from the terminal device T again. Name information is transmitted from a terminal device T in a format identical to that of response information, and hence, is acquired by the first acquisition unit 22.

In a case where a terminal device T is instructed to execute any of those described above, the instruction unit 27 start a timer. Afterward, in a case where second information could not have been acquired until a second period of time is reached after a terminal device T is instructed to execute transmission of the second information, the instruction unit 27 instructs the communication unit 10 to execute disconnection of communication with the terminal device T and stops acquisition of the second information.

In a case where name information could not have been acquired until a third period of time is reached after a terminal device T is instructed to execute retransmission of name information, the instruction unit 27 instructs the communication unit 10 to execute disconnection of communication with the terminal device T and stops acquisition of the name information.

Although a second period of time is set at, for example, 10 seconds and a third period of time is set at, for example, 5 seconds, this is not limiting and it is possible to change setting arbitrarily. None of a second period of time and a third period of time may be set.

The notification unit 28 notifies of a terminal device T detected by the detection unit 25 as a connectable terminal. Specifically, every time terminal information is input from the determination unit 26, the notification unit 28 produces a notification image based on such terminal information and the image information 33 in the storage unit 30, and outputs such a notification image to the notification device 50 to notify a user thereof.

Thereby, it is possible for a user to recognize a connectable terminal. Therefore, it is possible to improve convenience of a user. The notification unit 28 may produce sound or voice information of a connectable terminal and notify of such sound or voice information. A detail of a notification image produced by the notification unit 28 will be described later by using FIG. 4.

The notification device 50 is, for example, a touch panel display with a display unit, an operation unit, a sound or voice output unit, and the like. The notification device 50 notifies a user of a notification image that is input from the notification unit 28. The notification device 50 accepts a user operation and outputs a signal dependent on the user operation to the search unit 21. The notification device 50 corresponds to a touch panel display of a navigation device (illustration omitted) mounted on a vehicle.

Figure 3A:
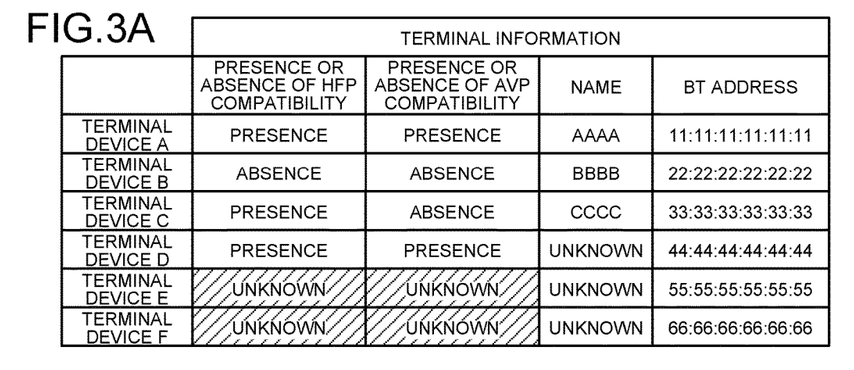
FIGS. 3A to 3C are diagrams illustrating specific examples of search result information.
Figure 3B:
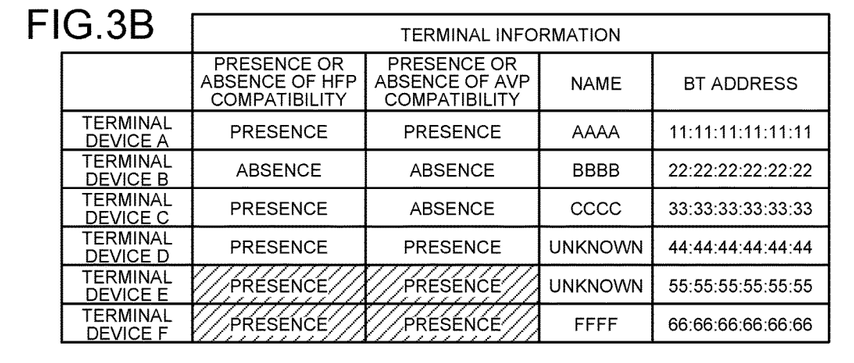
Figure 3C:
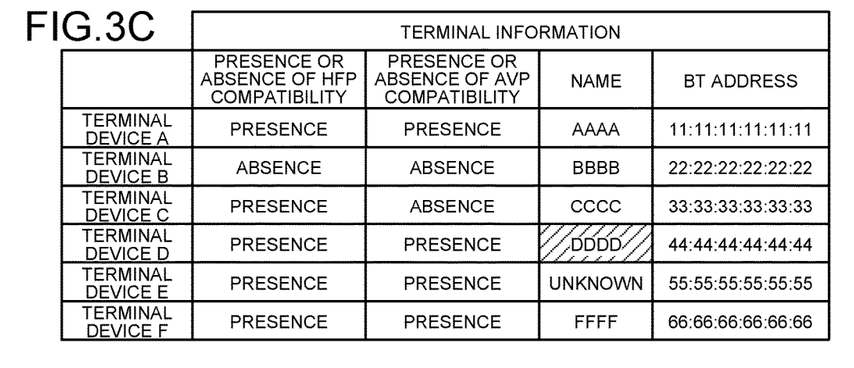

Next, a detail of a terminal detection process will be described by using FIG. 3A to FIG. 3C. FIG. 3A to FIG. 3C are diagrams illustrating specific examples of the search result information 31.

FIG. 3A to FIG. 3C illustrate temporal changes of the search result information 31. Specifically, FIG. 3A illustrates the search result information 31 after response information is acquired, and FIG. 3B illustrates the search result information 31 after second information is acquired. FIG. 3C illustrates the search result information 31 after name information is reacquired.

First, the search result information 31 after response information is acquired will be described by using FIG. 3A. FIG. 3A illustrates a situation where the communication device 1 acquires response information from a total of six terminal devices T that are terminal devices A to F and the search result information 31 is updated based on acquired response information.

As illustrated in FIG. 3A, the search result information 31 is information of "presence or absence of HFP compatibility", "presence or absence of AVP compatibility", a "name", and a "BT address" that are associated as terminal information for each terminal device T.

It is indicated that "presence or absence of HFP compatibility" and "presence or absence of AVP compatibility" as illustrated in FIG. 3A correspond to a hands-free call function and an audio reproduction function, respectively.

First, the detection unit 25 detects, for example, a terminal device T that is compatible with at least one of an HFP and an AVP as illustrated in FIG. 3A, as a terminal connectable to the communication device 1.

In FIG. 3A, the detection unit 25 detects a terminal device A, a terminal device C, and a terminal device D as connectable terminals and outputs terminal information of detected terminal devices T to the determination unit 26. The detection unit 25 does not detect a terminal device B that is not compatible with any of an HFP and an AVP, as a connectable terminal.

Herein, among the terminal device A, the terminal device C, and the terminal device D that are detected by the detection unit 25, a user is notified of the terminal device A and the terminal device C with a name being known, as connectable terminals.

Presence or absence of HFP compatibility and presence or absence of AVP compatibility are "unknown" for a terminal device T that has not notified the communication device 1 of first information as response information.

In FIG. 3A, a terminal device E and a terminal device F correspond thereto. The detection unit 25 extracts BT addresses of such a terminal device E and a terminal device F, outputs extracted BT addresses to the instruction unit 27, and notifies of a request of acquisition of second information. Thereby, a second information acquisition process is started in the communication device 1.

Next, the search result information 31 after a second information acquisition process will be described by using FIG. 3B. FIG. 3B illustrates the search result information 31 after second information is acquired from the terminal device E and the terminal device F. That is, FIG. 3B illustrates a case where the communication device 1 acquires second information from the terminal device E and the terminal device F in a state of the search result information 31 as illustrated in FIG. 3A.

The detection unit 25 newly detects the terminal device E and the terminal device F that are compatible with an HFP and an AVP, as terminals connectable to the communication device 1. Among terminal devices T (the terminal device E and the terminal device F) detected as connectable terminals, a user is herein notified of the terminal device E with a name being known, as a connectable terminal.

Among terminal devices T detected by the detection unit 25 as connectable terminals based on the search result information 31 as illustrated in FIG. 3A and FIG. 3B, the terminal device D and the terminal device F are terminal devices T with a name being unknown.

Accordingly, the determination unit 26 transmits BT addresses of the terminal device D and the terminal device E to the instruction unit 27 and outputs a request of reacquiring name information. Thereby, the instruction unit 27 instructs the terminal device D and the terminal device E to execute retransmission of name information.

Subsequently, the search result information 31 after reacquisition of name information will be described by using FIG. 3C. FIG. 3C illustrates a situation where the communication device 1 in a state of FIG. 3B acquires a name of the terminal device D.

FIG. 3C illustrates a case where the communication device 1 in a state of FIG. 3B could have acquired a name of the terminal device D and could not have acquired a name of the terminal device E until a third period of time as described above.

Herein, the terminal device D that could have acquired name information is notified of as a connectable terminal by using a name thereof and the terminal device E that could not have acquired name information within a third period of time is notified of by using a BT address instead of a name thereof.

Thus, name information of the terminal device D with a name being unknown is reacquired, so that it is possible to notify a user by using a name of the terminal device D. Thereby, it is possible for a user to readily recognize what terminal device T is a connectable terminal.

Figure 4:
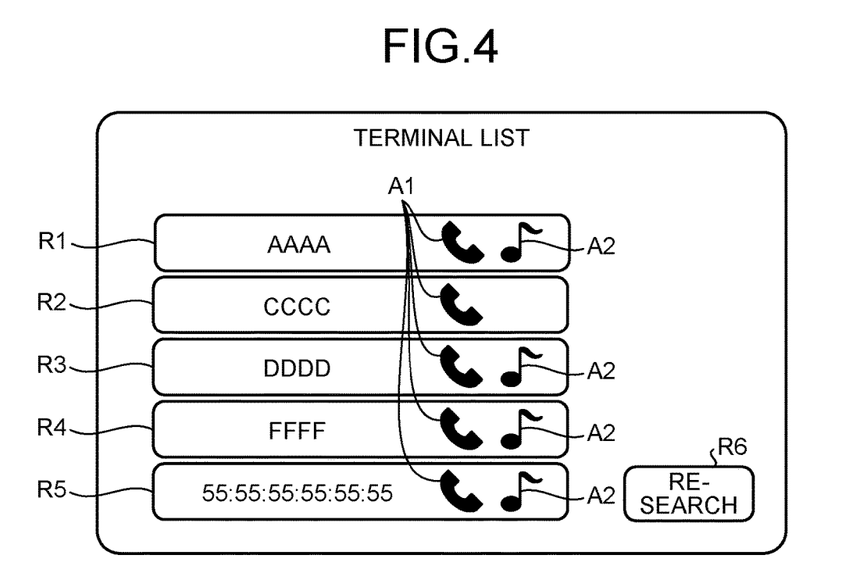
FIG. 4 is a diagram illustrating a specific example of a notification image.

Next, a notification image that is produced based on the search result information 31 as described by using FIG. 3A to FIG. 3C will be described by using FIG. 4. FIG. 4 illustrates a situation where the notification device 50 notifies of a notification image.

As illustrated in the same figure, a terminal connectable to the communication device 1 that is detected by the detection unit 25 is displayed as a terminal list in a notification image.

Specifically, information of the terminal device A, the terminal device C, the terminal device D, the terminal device F, and the terminal device E that are detected as terminals connectable to the communication device 1 are displayed in areas R1 to R5, respectively.

Herein, a name of each terminal device T is usually displayed in a terminal list as indicated in areas R1 to R4, and a BT address (example of identification information) of the terminal device E whose name could not have been acquired is displayed instead of the name as indicated in an area R5.

Thus, identification information of the terminal device E whose name could not have been acquired is displayed instead of the name, so that it is possible for a user to recognize a terminal device T more readily than a case where nothing is displayed.

FIG. 4 illustrates a case where a BT address is used as identification information and this is not limiting. For example, another type of information (for example, a model name or the like) may be used that is acquired from a terminal device T instead of a BT address.

An icon A1 or an icon A2 that indicates a terminal function that is possessed by a terminal device T is displayed in each of the areas R1 to R5. For example, an icon A1 is an image that indicates that it corresponds to an HFP and an icon A2 is an image that indicates that it corresponds to an AVP. Thus, an icon is displayed in combination, so that it is possible for a user to recognize a terminal function that is possessed by a terminal device T.

For example, as a user pushes an area where a terminal device T that is desired to be connected is displayed, the notification device 50 instructs the communication device 1 to execute connection to such a terminal device T. Thereby, the communication device 1 is connected to such a terminal device T.

An icon A1 and an icon A2 as illustrated in the same figure are merely examples and this is not limiting. That is, as long as it is possible for a user to recognize a terminal function that is possessed by a terminal device T, a character or another graphic may be provided. None of icons A1 and A2 may be displayed in a notification image.

In a case where a user pushes an area R6 where "re-search" is displayed, the notification device 50 outputs a request of re-search to the search unit 21 as illustrated in FIG. 2. Thereby, a terminal detection process as described above is executed in the communication device 1 again. It is possible to arbitrarily change whether or not "re-search" of such an area R6 is also displayed.

Figure 5:
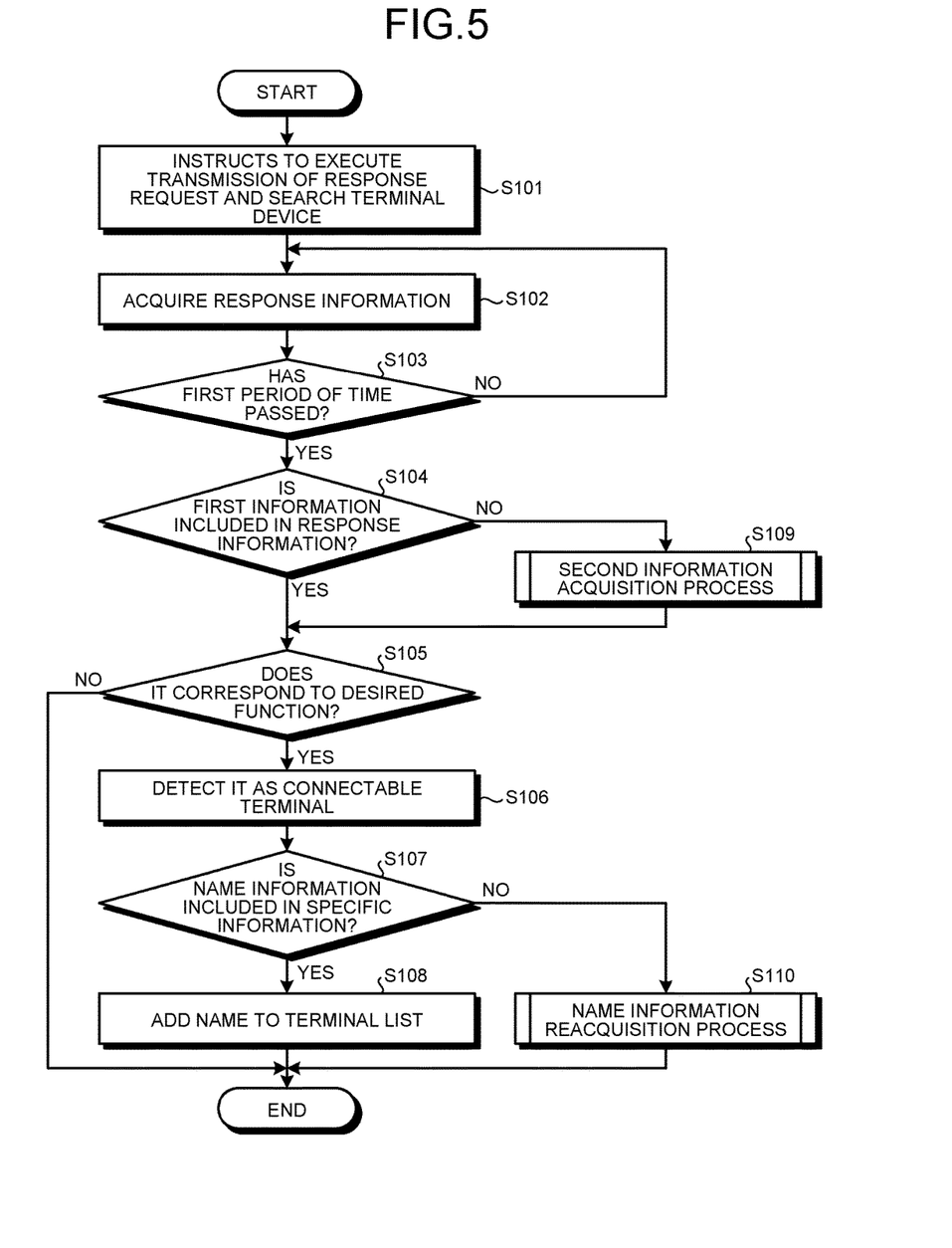
FIG. 5 is a flowchart illustrating a terminal detection process that is executed by a communication device.

Next, a terminal search process that is executed by the communication device 1 will be described by using FIG. 5. FIG. 5 is a flowchart illustrating a terminal search process that is executed by the communication device 1.

As illustrated in FIG. 5, first, the search unit 21 of the communication device 1 instructs the communication unit 10 to execute transmission of a response request and searches a terminal device T (step S101). Then, the first acquisition unit 22 acquires response information from a terminal device T that has received a response request (step S102).

Then, the search unit 21 determines whether or not a first period of time has passed (step S103). In such determination, in a case where the search unit 21 determines that a first period of time has passed (step S103, Yes), the detection unit 25 determines whether or not first information is included in response information, based on the search result information 31 (step S104). In determination at step S103, in a case where the search unit 21 determines that a first period of time has not passed (step S103, No), the first acquisition unit 22 returns to step S102 and continues acquisition of response information.

Then, in determination at step S104, in a case where the detection unit 25 determines that first information is included in response information (step S104, Yes), the detection unit 25 determines whether or not a terminal device T corresponds to a desired function cooperative with the communication device 1 based on first information (step S105).

In such determination, in a case where the detection unit 25 determines that a terminal device T does not correspond to a desired function (step S105, No), such a terminal device T is not detected as a terminal connectable to the communication device 1 but such a process is ended.

In determination at step S105, in a case where the detection unit 25 determines that a terminal device T corresponds to a desired function (step S105, Yes), the detection unit 25 detects such a terminal device T as a terminal connectable to the communication device 1 (step S106).

Subsequently, the determination unit 26 determines whether or not name information is included in specific information of a terminal device T detected so as to be connectable (step S107). In such determination, in a case where the determination unit 26 determines that name information is included (step S107, Yes), the notification unit 28 adds a name to a terminal list of a notification image.

In determination at step S104, in a case where the detection unit 25 determines that first information is not included in response information (step S104, No), the control unit 20 executes a second information acquisition process (step S109) and executes a process at step S105 and later. Process steps of a second information acquisition process at step S109 will be described later by using FIG. 6.

In determination at step S107, in a case where the determination unit 26 determines that name information is not included in specific information (step S107, No), the control unit 20 executes a name information reacquisition process (step S110) and ends such a process. A name information reacquisition process at step S110 will be described later by using FIG. 7.

Figure 6:
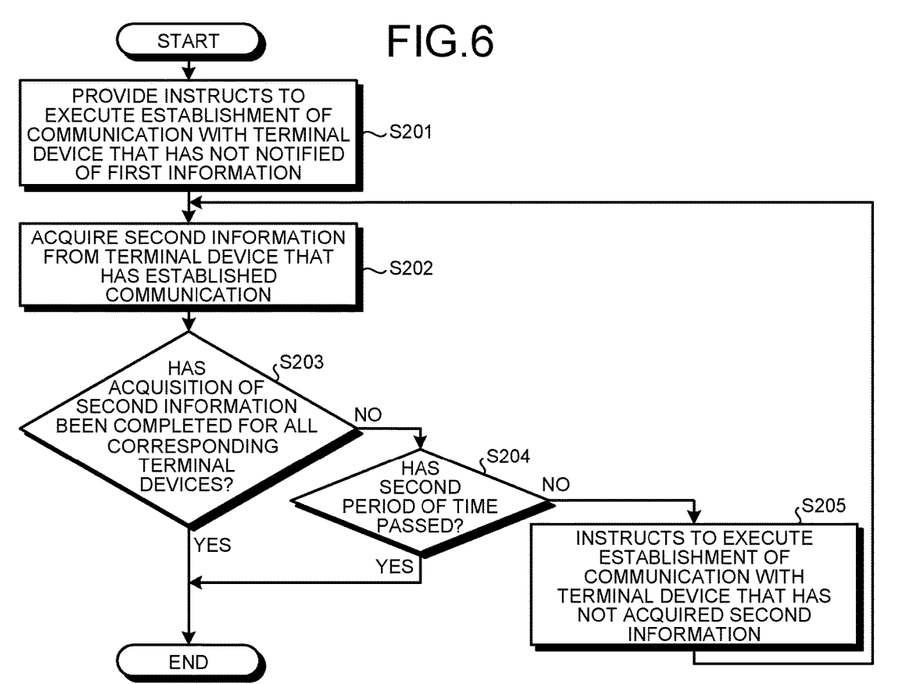
FIG. 6 is a flowchart illustrating a second information acquisition process that is executed by a communication device.

Next, process steps of a second information acquisition process that is executed by the communication device 1 will be described by using FIG. 6. FIG. 6 is a flowchart illustrating process steps of a second information acquisition process that is executed by the communication device 1. Such process steps correspond to step S109 as illustrated in FIG. 5.

As illustrated in FIG. 6, first, in a case where a request of acquisition of second information is input from the detection unit 25, the instruction unit 27 instructs the communication device 1 to execute establishment of communication with a terminal device T that has not notify of first information (step S201).

Then, the second acquisition unit 23 acquires second information from a terminal device T that has established communication at step S201 (step S202). Subsequently, the instruction unit 27 determines whether or not acquisition of second information has been completed for all corresponding terminal devices T (step S203).

In such determination, in a case where the instruction unit 27 determines that acquisition of second information has been completed for all of terminal devices T (step S203, Yes), the control unit 20 ends a second information acquisition process.

On the other hand, in determination at step S203, in a case where the instruction unit 27 determines that acquisition of second information has not been completed (step S203, No), the instruction unit 27 determines whether or not second period of time has passed (step S204).

In such determination, in a case where the instruction unit 27 determines that a second period of time has passed (step S204, Yes), the control unit 20 ends a second information acquisition process. On the other hand, in determination at step S204, in a case where the instruction unit 27 determines that a second period of time has not passed (step S204, No), the instruction unit 27 instructs to execute establishment of communication with a terminal device T that has not acquired second information (step S205) and executes a process at step S202 and later as described above.

As a second information acquisition process is ended, the control unit 20 executes a process at step S105 and later as illustrated in FIG. 5.

Figure 7:
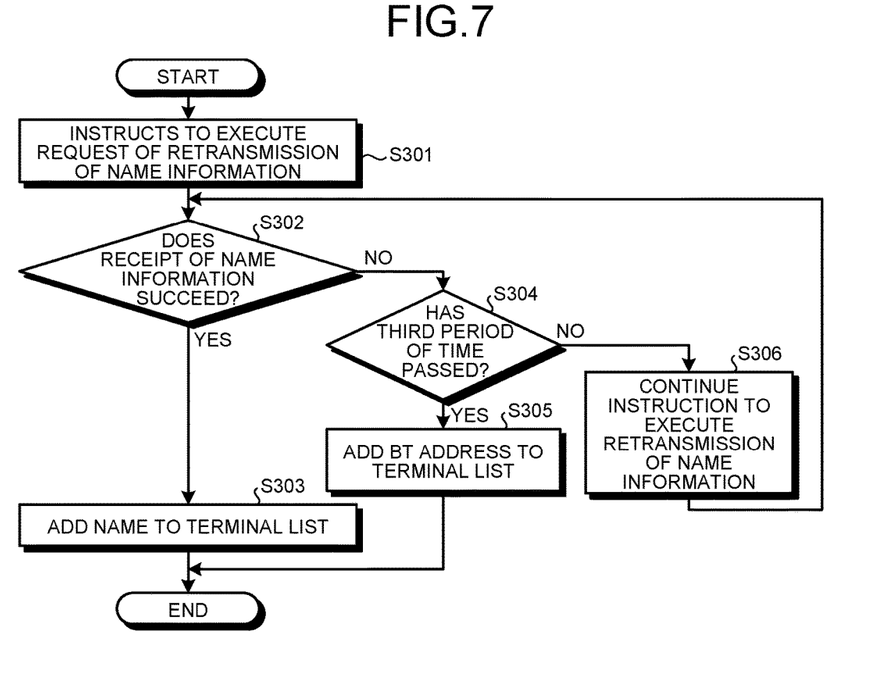
FIG. 7 is a flowchart illustrating a name information reacquisition process that is executed by a communication device.

Subsequently, process steps of a name information reacquisition process will be described by using FIG. 7. FIG. 7 is a flowchart illustrating process steps of a name information reacquisition process that is executed by the communication device 1.

As illustrated in FIG. 7, as a request of reacquisition of name information is input from the detection unit 25, the instruction unit 27 instructs to execute retransmission of name information to a terminal device T through the communication unit 10 (step S301). Subsequently, the determination unit 26 determines whether or not receipt of name information succeeds (step S302).

In such determination, in a case where the determination unit 26 determines that receipt of name information succeeds (step S302, Yes), the notification unit 28 adds a name to a terminal list (step S303) and ends such a process.

On the other hand, in determination at step S302, in a case where the determination unit 26 determines that receipt of name information does not succeed (step S302, No), the instruction unit 27 determines whether or not a third period of time has passed (step S304).

In such determination, in a case where the instruction unit 27 determines that a third period of time has passed (step S304, Yes), the notification unit 28 adds a BT address to a terminal list (step S305) and ends such a process. In determination at step S304, the instruction unit 27 determines that a third period of time has not passed (step S304, No), the instruction unit 27 continues an instruction to execute retransmission of name information (step S306) and the control unit 20 executes a process at step S302 and later.

In the present invention, a terminal detection method includes a search step, a first acquisition step, a second acquisition step, and a detection step. The search step transmits a response request through broadcast communication and searches a terminal device T that exists within a predetermined range R. The first acquisition step acquires, from a terminal device T, at least specific information of the terminal device T in response information that includes the specific information and first information that indicates a function that is possessed by the terminal device T, as a response to a response request. The second acquisition step separately executes communication with a terminal device T based on specific information acquired in the first acquisition step and acquires second information that indicates a function that is possessed by the terminal device T, in a case where first information is not included in response information acquired in the first acquisition step. The detection step detects a terminal device T that has a desired function based on first information acquired in the first acquisition step and second information acquired in the second acquisition step. Therefore, it is possible for a terminal detection method according to the present embodiment to improve detection accuracy of a terminal device T that has a desired function.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal detection method, comprising:
transmitting a response request through broadcast communication and searching a terminal device that exists within a predetermined range;
acquiring, from the terminal device, at least specific information of the terminal device in response information that includes the specific information and first information that indicates a function that is possessed by the terminal device, as a response to the response request;
separately executing communication with the terminal device based on the acquired specific information, and acquiring second information that indicates a function that is possessed by the terminal device, in a case where the first information is not included in the acquired response information; and
detecting the terminal device that has a desired function based on the acquired first information and the acquired second information.

2. The terminal detection method according to claim 1, further comprising:
determining whether or not name information that indicates a name of the terminal device is included in the specific information of the detected terminal device; and
instructing the terminal device to execute transmission of the name information in a case where it is determined that the name information is not included.

3. The terminal detection method according to claim 2, further comprising
notifying of the terminal device as a connectable terminal by using the name information in a case where it is determined that the name information is included in the specific information of the terminal device or a case where the name information is acquired from the terminal device.

4. The terminal detection method according to claim 3, wherein the notifying includes notifying of the terminal device as the connectable terminal by using identification information that is included in the specific information instead of the name information in a case where it is impossible to acquire the name information from the terminal device within a predetermined period of time after an instruction to execute transmission of the name information is provided.

5. A communication device, comprising a processor programmed to:
transmit a response request through broadcast communication and search a terminal device that exists within a predetermined range;
acquire, from the terminal device, at least specific information of the terminal device in response information that includes the specific information and first information that indicates a function that is possessed by the terminal device, as a response to the response request;
separately execute communication with the terminal device based on the acquired specific information, and acquire second information that indicates a function that is possessed by the terminal device, in a case where the first information is not included in the acquired response information; and
detect the terminal device that has a desired function based on the acquired first information and the acquired second information.

6. The communication device according to claim 5, wherein the processor is further programmed to:
determine whether or not name information that indicates a name of the terminal device is included in the specific information of the detected terminal device; and
instruct the terminal device to execute transmission of the name information in a case where it is determined that the name information is not included.

7. The communication device according to claim 6, wherein the processor is further programmed to:
notify of the terminal device as a connectable terminal by using the name information in a case where it is determined that the name information is included in the specific information of the terminal device or a case where the name information is acquired from the terminal device.

8. The communication device according to claim 7, wherein the processor is programmed to notify of the terminal device as the connectable terminal by using identification information that is included in the specific information instead of the name information in a case where it is impossible to acquire the name information from the terminal device within a predetermined period of time after an instruction to execute transmission of the name information is provided.

\* \* \* \* \*